(12) United States Patent
Konchitsky

(10) Patent No.: US 9,694,709 B1
(45) Date of Patent: *Jul. 4, 2017

(54) HOVERING SKATE BOARD UNIT WITH SAFETY MECHANISM AND METHOD THEREOF

(71) Applicant: Ron Konchitsky, Sunnyvale, CA (US)

(72) Inventor: Ron Konchitsky, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,192

(22) Filed: Jan. 26, 2017

Related U.S. Application Data

(63) Continuation-in-part of application No. 15/013,806, filed on Feb. 2, 2016.

(60) Provisional application No. 62/131,404, filed on Mar. 11, 2015.

(51) Int. Cl.
| | |
|---|---|
| *B60L 13/04* | (2006.01) |
| *A63C 17/26* | (2006.01) |
| *A63C 17/00* | (2006.01) |
| *A63C 17/12* | (2006.01) |
| *A63C 17/01* | (2006.01) |

(52) U.S. Cl.
CPC .......... *B60L 13/04* (2013.01); *A63C 17/0046* (2013.01); *A63C 17/011* (2013.01); *A63C 17/12* (2013.01); *A63C 17/26* (2013.01)

(58) Field of Classification Search
CPC ... B60L 13/04; A63C 17/0046; A63C 17/011; A63C 17/12; A63C 17/26; A63C 17/01; A63C 17/012; A63C 17/015; A63C 17/067
See application file for complete search history.

(56) References Cited

U.S. PATENT DOCUMENTS

| | | | | |
|---|---|---|---|---|
| 7,671,712 B2* | 3/2010 | Elliott | ................... | H01F 7/0236 335/209 |
| 7,760,058 B2* | 7/2010 | Fullerton | .............. | H01F 7/0284 335/285 |
| 9,126,487 B2* | 9/2015 | Henderson | .............. | B60L 13/04 |
| 9,148,077 B2* | 9/2015 | Henderson | ............. | H02N 15/00 |
| 9,352,665 B2* | 5/2016 | Melvin | .................... | B60L 13/04 |
| 9,440,714 B2* | 9/2016 | Robinson | .................. | B63B 9/00 |
| 2004/0094662 A1* | 5/2004 | Sanders, Jr. | ............ | B64C 27/20 244/12.5 |
| 2016/0236075 A1* | 8/2016 | Liotta | ........................ | A63F 9/34 |
| 2016/0340035 A1* | 11/2016 | Duru | ....................... | B64C 27/20 |

* cited by examiner

*Primary Examiner* — Hau Phan
*Assistant Examiner* — Jacob Meyer

(57) ABSTRACT

A safe hovering skate board unit capable of being driven by a user is disclosed. The hovering skateboard includes a first board to receive the user, one or more first magnetic source, configured with the first board, to emit magnetic field, a second board magnetically coupled with the first board, one or more second magnetic source configured with the second board to repel the magnetic field and facilitate the first board to hover over the second board. Further, the unit includes the ground engaging wheels attached to the second board moves in the direction driven by the user. Furthermore, the unit may include a specialized safety system for ensuring safety of the user by controlling one or more components corresponding to the hovering skateboard unit based on one or more factors corresponding to the user. Further, a corresponding method of operating the hovering skate board unit is also disclosed.

20 Claims, 4 Drawing Sheets

HOVERING SKATE BOARD UNIT WITH SAFETY MECHANISM AND METHOD THEREOF

This application is a continuation in part ("CIP") patent and claims the priority date(s) of U.S. patent application Ser. No. 15/013,806 filed Feb. 2, 2016. The '806 application claims the benefit of application Ser. No. 62/131,404 filed on Mar. 11, 2015, the contents of which are herein incorporated by reference.

TECHNICAL FIELD

The present invention relates in general to a skateboard and particularly to hovering skateboard used for translatory movement by a user.

DESCRIPTION OF RELATED ART

The usage of the concept of 'hovering' or 'levitating' for performing swift translatory movements on terrestrial or snow or other mediums have been observing quite an increasing trend over the recent years. Examples of popular sports using 'hovering' or 'levitating' may include Skateboarding, Surfing, Snowboarding and so on. Skateboarding can be considered as an art performed as purely a recreational activity or a job or a mode of transportation. A typical levitating board used for personal transportation is a hover board.

It can be observed that a hover board more or less resembles to that of a skateboard sans wheels, utilizing electromagnetic principles for levitation. Various attempts have been made for frictionless displacement of the objects. The frictionless displacement takes place due to the well-known action of two permanent magnets placed on the two surfaces separated by a required distance between them and the forces of attraction or repulsion between these two magnets, depending upon the alignment of the poles of the magnets.

The conventional hover boards are characterized by the presence of magnets configured to the bottom of their surfaces, which in turn utilize the repulsive forces, of a plurality of magnets. The force obtained by the magnetic repulsion is utilized to counteract the gravitational force and lift the hover board. However, there are inherent limitations, which can be flagrantly observed in the conventional hover board models and typical limitation of these types of hover boards can be that of batteries of them being capable of supplying power only for few minutes. Still, it can be observed, that the conventional hover board kinds, can float only above fixed conductive surfaces like nonferrous metallic surfaces and they cannot be versatile ones, that is being capable of floating upon all kinds of surfaces including ferrous or non metallic surfaces and the likes.

Therefore, based on the aforementioned, it can be observed that the present types of hover boards, lack in the contrivances of effectively controlling their motions in one or more axes. There is a need for an improved hovering skateboard driven by a user that is magnetically lifted and is used on various surfaces. Further there is also a need of a hovering skateboard that may be remotely controlled. Additionally, there is also a need of a hovering skateboard in which the conductive surface is movable along with the hover board without the need of a separate conductive surface.

SUMMARY OF THE INVENTION

According to one embodiment of the present invention, a hovering skate board is provided with elements essentially comprising of components or sub assembly which includes that of a first board intended to receive the user, one or plurality of first magnetic sources, and a second magnetic board, and at least one wheel, that is capable of engaging with that of terrestrial surface.

The one or more first magnetic source is configured with the first board to emit a required magnetic field. In an embodiment, the emitted magnetic field may be of predetermined magnetic flux density and strength. The second magnetic source is configured with the second board to provide repulsive force to that of the first magnetic source, thus facilitating the first board to hover over the second board. The at least one wheel, rotatably attached, with required degrees of freedom, i.e., forward, backward, up, down, left, right, pitch, yaw and roll, to the second board enabling movement of the user in any desired direction of the hover board.

In an embodiment of the present invention, a hovering skate board unit is provided. The hovering skate board unit may include, but is not limited to, a first board and a second board magnetically coupled to the first board. The first board configured to receive a user thereon and may have one or more first magnetic sources configured thereto. Herein, the one or more first magnetic sources may be configured to emit magnetic field. Further, the second board may have one or more second magnetic sources configured thereto to repel the magnetic field emitted from the one or more first magnetic source, and thereby facilitates the first board to hover over the second board.

Hereinabove, the first board is configured to receive the user thereon. Further, at least one of the first magnetic sources and the second magnetic sources is selected from at least one of various choices such as a permanent magnet, an electromagnet, electrets, a magnetized ferromagnetic material, a soft magnetic material; and a superconductive magnetic material. The first magnet sources and the second magnet sources may be selected based on one or more parameters. The one or more parameters may include, but are not limited to, required magnetic flux density, polarity, strength of magnetic field and one or more other desired parameters.

Further, the hovering skate board unit may include at least one terrestrially engaging wheel attached to the second board for enabling movement in direction driven by a user. The at least one terrestrially engaging wheel may facilitate at least one of: upward movement, downward movement, left movement, right movement, forward movement, backward movement, tilting forward, tilting backward, turning left, turning rightwards and turning from one side to another side.

Furthermore, the hovering skate board unit may include a safety mechanism implemented by a specialized safety system for ensuring safety of the user by controlling one or more components corresponding to the hovering skateboard unit based on one or more factors corresponding to the user. The specialized safety system may include a memory having a database and a specific set of instructions. The specialized safety system may further include a specialized processor for executing the specific set of instructions for adopting safety measures of the user. Further, the safety system may include a Global Positioning System (GPS) to provide location information, corresponding to location of the user, to the processor, wherein the processor adjusts one or more components of the hovering skateboard unit based on at least one of the location information, and the one or more factors corresponding to the user. Furthermore, the safety system of the hovering skate board unit may include a communication unit for transmitting an activity report to a remote location, the activity report corresponding to activities of the hovering skate board.

Furthermore, the hovering skate board unit may include a controlling unit capable of being remotely operated, for controlling the second board and thereby for steering the hovering skate board unit. In an embodiment, the controlling unit comprises at least one of: one or more mechanical switches, touch screen interface buttons, mechanisms which can be rotated or tilted, a wheel, a joy stick, a key pad, a roller ball, a touch pad, a foot pedal, a lever arm, a throttle, a microphone used to input voice commands and a camera used to input gesture commands.

Another object of the present invention is to provide a suitable means of controlling the second board to ensure a reliable degree of assurance to the user of exercising desired control while operating the hover board.

Yet another object of the present invention is to provide plurality of connectors detachably attachable to the first board and the second board for creating a space between the first board and the second board.

In an embodiment of the present invention, a method of operating hovering skate board unit is provided. The method includes receiving a user on a first board having one or more first magnetic sources configured thereto. The first board is magnetically coupled to a second board. Further, the method comprising controlling one or more components corresponding to the hovering skate board based on one or more factors corresponding to the user, and thereby ensuring safety of the user while utilizing the hovering skate board. Herein, the second board is having one or more second magnetic sources configured thereto to repel magnetic field emitted from the one or more first magnetic source, thereby facilitates the first board to hover over the steered second board. Further, herein, the second board may be detachably attached to at least one terrestrially engaging wheel.

Hereinabove, controlling of at least one of the speed and the direction of the second board may include controlling at least one terrestrially engaging wheel attached to the second board. The terrestrially engaging wheels may be controlled for at least one of: upward movement, downward movement, left movement, right movement, forward movement, backward movement, tilting forward, tilting backward, turning left, turning rightwards and turning from one side to another side. Further, the method may include lifting the first board over the second board up to a predetermined height. The method may further include utilizing one or more connectors capable to detachably attaching the first board and the second board for creating space there-between. Further, the one or more components comprising controlling the speed and the direction of the second board. Furthermore, the one or more factors comprise at least one of: stored past information of the user, profile information, detected information corresponding to the user and the current location of the user.

The aforementioned features and advantages will become apparent from the following detailed description of illustrative embodiments thereof, which is to be read in connection with the accompanying drawings.

BRIEF DESCRIPTION OF THE DRAWINGS

Figure 1:
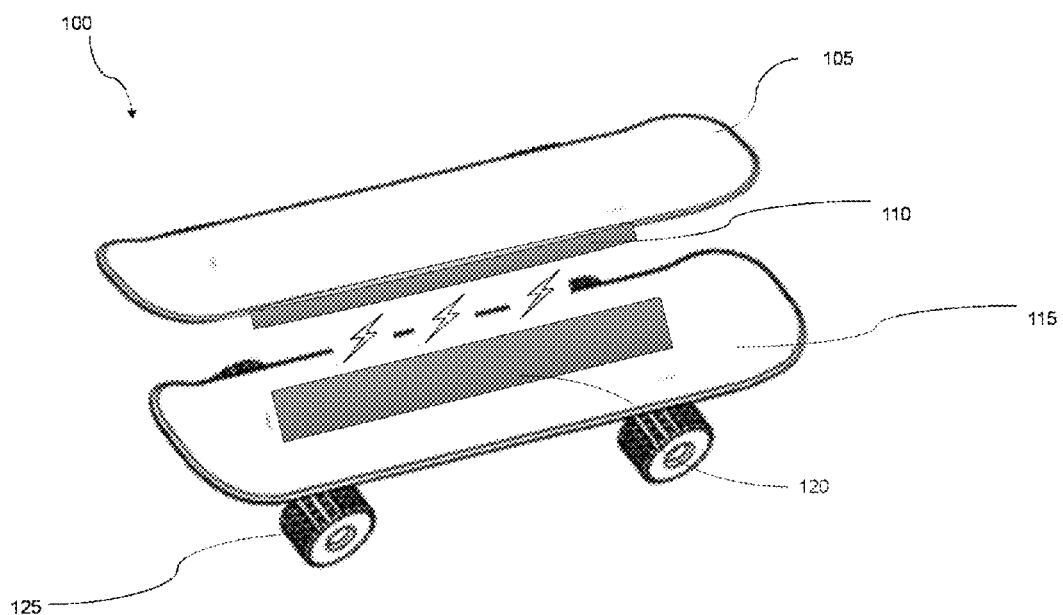
Figure 2:
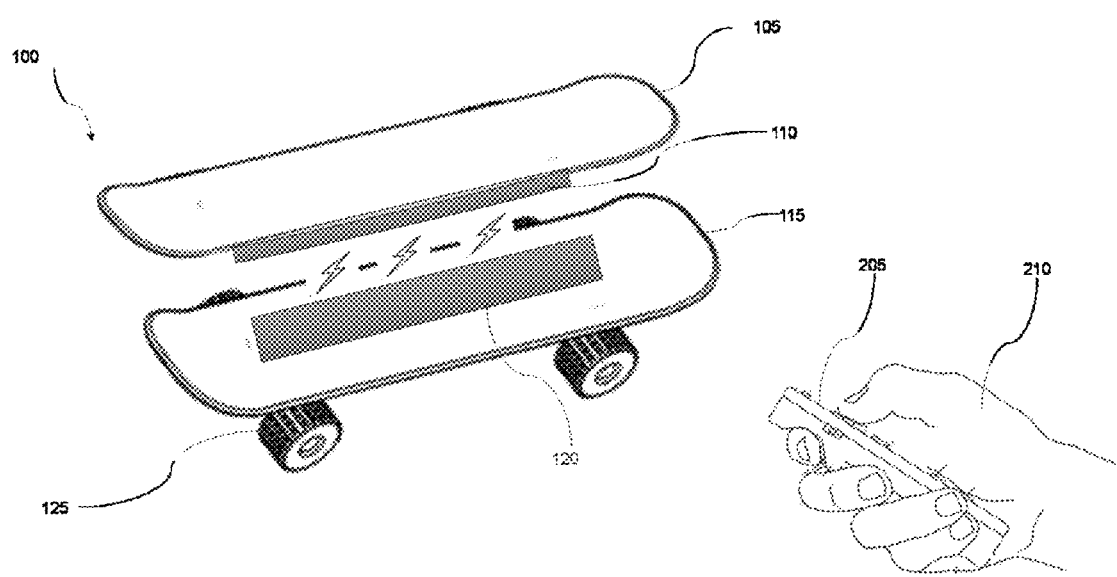
Figure 3A:
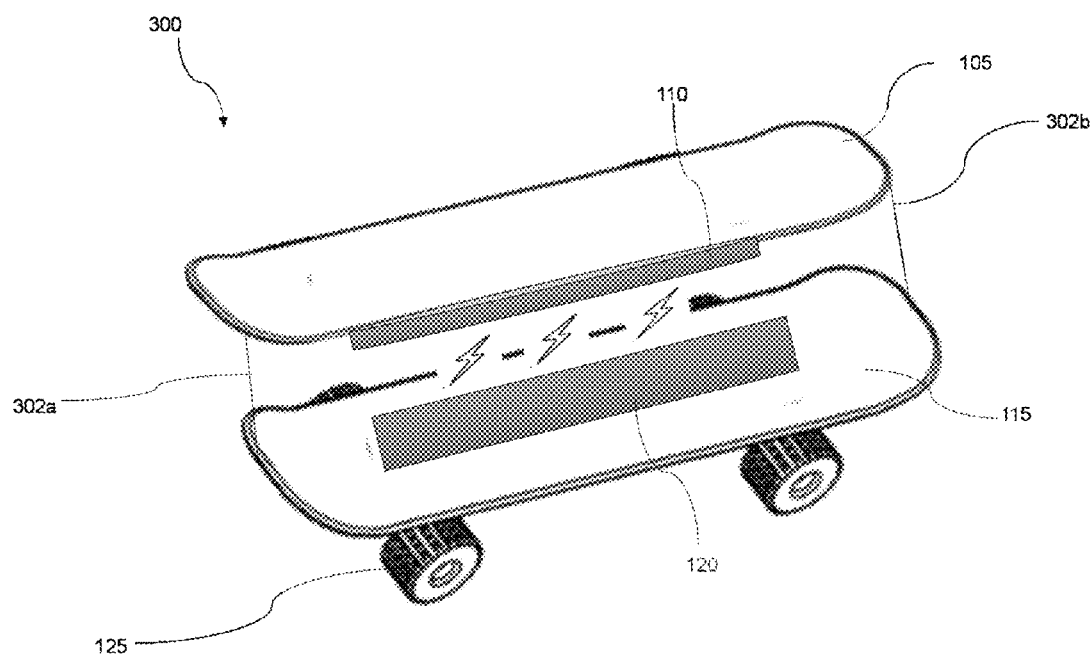
Figure 3B:
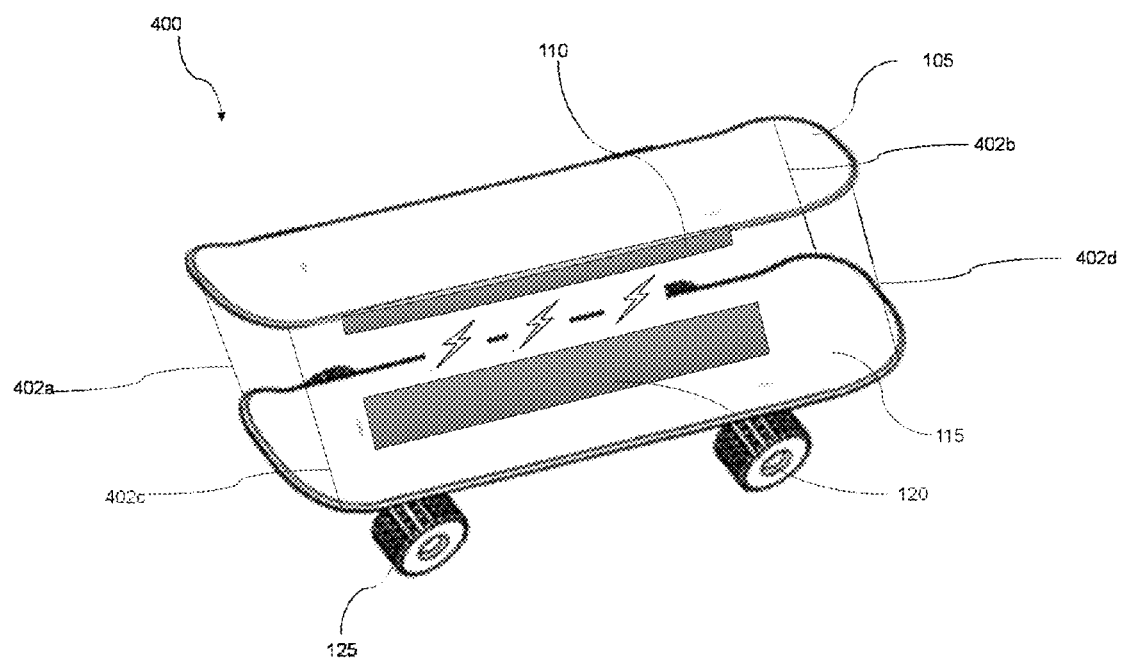

Having thus described the invention in general terms, reference will now be made to the accompanying drawings, which are not necessarily drawn to scale, and wherein:

FIG. 1 depicts a schematic block diagram of a hovering skateboard, in accordance with a preferred embodiment of the present invention;

FIG. 2 illustrates a schematic block diagram of a hovering skateboard unit configured with a controlling unit, in accordance with another preferred embodiment of the present invention;

FIG. 3a illustrates a schematic block diagram of a hovering skateboard configured with two connectors, in accordance with another embodiment of the present invention; and FIG. 3b showing a schematic block diagram of a hovering skateboard configured with four connectors, in accordance with another embodiment of the present invention.

It must be understood that the accompanying summary along with detailed description of certain embodiments of the present invention can be better understood in conjunction with that of the related drawings appended. For the purpose of illustrating the invention, certain embodiments are shown in the drawings. It should be understood, however, that the present invention is not limited to the arrangements and instrumentation as shown in the accompanying drawings.

On a further note that it must be understood that the drawings accompanying the present invention and necessarily not to scale and some of the elements in the drawings can be seen given exaggerated in size relative to that of others which has been done for the sake highlighting and clarity. Also, in some cases one or several physical components of the hover board unit may be included in one functional block or element or even divided into more than one functional unit or element.

DETAILED DESCRIPTION OF DRAWINGS

While this invention is illustrated and described in a preferred embodiment, and it is to be understood that a hovering skateboard may be produced in many different sizes, shapes and colors. The embodiment(s) of the present invention has been depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated.

Those skilled in the art will envision many other possible variations within the scope of the present disclosure.

FIG. 1 Depicts a schematic block diagram of a hovering skateboard driven by a user, in accordance with a preferred embodiment of the present invention. The hovering skateboard 100 includes a first board 105 for receiving the user (not represented in the figure), one or more first magnetic sources 110 (hereinafter may interchangeably be referred to as 'the first magnetic sources 110'), a second board 115, one or more second magnetic sources 120 (hereinafter may interchangeably be referred to as 'the second magnetic sources 120'), and at least one terrestrially engaging wheel 125.

The first magnetic sources 110, unitary or plural in number, are configured with the first board 105 for emitting magnetic field with required magnetic flux density. Examples of the first board 105 includes, but not limiting to, skateboard deck, freestyle deck, long board deck, old school deck and modern school deck for receiving items, people or inventory and the likes.

The constituent material for making of the first board 105 may be including a range of different materials like hard rock maple, bamboo decks, synthetic decks using fiber glass, glue resin and other materials.

The magnetically coupled second board 115 with that of the first board 105 includes, but not limiting to, a skateboard, a surfboard, a snowboard, a snake-board, a freestyle scooter board and a carve board. However, it would be readily apparent for those skilled in the art that various types, sizes and shapes of the first board 105 and the second board 115 can be readily envisioned without deviating from the scope of the present invention.

The one or more second magnetic source 120 which is configured to that of the second board 115 so as to repel the magnetic field emitted from the one or more first magnetic source 110. Thus it can be seen that this force of magnetic repulsion facilitates the first board 105 to hover or levitate over the second board 115.

The constituent materials of the magnetic sources may include, but not limiting to, that of permanent magnets, electromagnets, electrets, Ferromagnetic materials, or soft magnetic materials, and also that of superconductive magnetic materials. Further the magnetic sources may be either singular or might even include a plurality of magnetic sources. In an embodiment, the magnetic sources may be selected based on one or more parameters such as, but are not limited to, required magnetic flux density, polarity, strength of magnetic field and one or more other desired parameters.

Further, the ground engaging wheel 125 attached to the second board 115 moves the hovering skateboard in the direction driven by the user (not shown in figure). The ground engaging wheels may have different sizes and shapes to suit different types and application of skating. The ground engaging wheel 125 may vary in number. Examples of the number of ground engaging wheel 125 may include, but not limited to, one wheel, two wheels, three wheels, four wheels and five wheels, thus providing scope for including a plurality of wheels. Further, in an embodiment, the degrees of freedom imparted for the ground engaging wheels, may range from one to six. That is for rotational and translational motions, viz., Upward and downward movement (heaving), Left and right movement (swaying), Forward and Backward movement (surging), tilting of forward and backward (pitching), Turning left and rightwards (Yawing), Turning from one side to another (rolling).

The polarity of the magnetic source as it is well known that it has a south pole and a north pole. Further, in an embodiment, the first magnetic source 110 and the second magnetic source 120 are provided with an alignment in such a way that their polarities are same in direction resulting in a repelling spatial force. This phenomenon may cause the first board 105 to hover over the second board 115.

However for those skilled in the art it would be readily apparent, that various principles may be used to hover the first board 105 over the second board 115. Examples of the principle may include, but not limited to, the electrical, electromagnetic, and magnetic principle such as magnetic levitation. Magnetic levitation is a phenomenon through which an object can be kept up in the air, as in the case of a train travelling over a rail, by means of magnetic fields.

In an exemplary embodiment a person is capable of standing or an object may be placed on the first board 105. The first board 105 hovers over the second board 115 and moves as the second board 115 moves. The levitation action in the first board 105 may be sufficient to support the weight of a user or an object up to 300 pounds. The first board 105 may lift the user up to a predefined height. For example the first board 105 may be capable of getting lifted over the second board 115 up to three inches.

FIG. 2 illustrates schematic block diagram of a hovering skateboard configured with a controlling unit, in accordance with another embodiment of the present invention. The hovering skateboard 100 includes the controlling unit 205 to exercise control over the second board 115. In an embodiment, the controlling unit may be utilized for remote controlling of the second board. The controlling unit may include, but is not limited to, a remote or a joystick to control the second board.

A user 210 may control the speed and directions of the second board 115 using the controlling unit 205. The user 210 may input rotate signal through the controlling unit 205 to the second board 115 or may provide input to the controlling unit to move the second board 115 in a forward direction, a rearward direction, leftwards direction, rightwards direction, or combination thereof.

In an exemplary embodiment, the controlling unit 205 may include, but not limited to, mechanical switches, mechanical buttons, touch screen interface buttons, mechanisms which can be rotated or tilted, a wheel, a joy stick, a key pad, a roller ball, a touch pad, a foot pedal, a lever arm, a throttle, a microphone used to input voice commands and a camera used to input gesture commands.

The controlling unit 205 controls the second board 115 through a wired connection or through wireless means. In an embodiment, the wireless means may include, but are not limited to, Wi-Fi, Bluetooth, infrared and so on. In another exemplary embodiment the hovering skateboard 100 may be propelled by a user standing on the first board 105 with one foot and pushes off the hovering skateboard 100 with the other foot. In another embodiment the hovering board 100 may be used on different surfaces such as ground, snow, water etc.

FIGS. 3a and 3b illustrates schematic block diagram of a hovering skateboard configured with two connectors and four connectors respectively, in accordance with another embodiment of the present invention.

In an exemplary embodiment as shown in FIG. 3a, the hovering skate board 300 includes two connectors 302a and 302b. The connectors 302a and 302b may be detachably attached to the first board 105 and second board 115.

The connectors 302a and 302b which are connecting the first board 105 and the second board 115 to create a space and creates parallel relation in between the first board 105 and the second board 115. The length of the connectors 302a and 302b may be adjusted to adjust the space between the first board 105 and the second board 115

The connectors 302a and 302b may be detachably fastened at variable positions on the first board 105 and second board 115 for creating a space in between the first board and the second board.

Examples of positions for detachably attaching the connectors 302a and 302b include, but not limited to, the ends of the first board 105 and second board 115 and at the center position of the first board 105 and the second board 115. However it would be readily apparent to those skilled in the art that the connectors 302a and 302b may be positioned at variable positions on the first board 105 and second board 115.

In another exemplary embodiment as shown in FIG. 3b, the hovering skate board 400 includes four connectors 402a, 402b, 402c and 402d. The connectors 402a, 402b, 402c and 402d may be connected at the corners of the first board 105 and second board 115

It would be readily apparent to those skilled in the art that various types of connectors 302a 302b, 402a, 402b, 402c and 402d may be used. In an embodiment, the connectors (such as connectors 302a 302b, 402a, 402b, 402c and 402d) may include, but not limited to, strings, chain etc. Examples of the material used for connectors 302a, 302b, 402a,(402b), 402c and 402d may include, but not limiting to, that of synthetic resin such as nylon or polypropylene and metal.

In an embodiment of the present invention, the hovering skateboard may include a specialized safety system (hereinafter may interchangeably be referred to as 'specialized system') to ensure safety of a user. The specialized system may have a memory with a specific set of instructions and a specialized processor to execute such specific set of instructions. The memory may further include a database to store information corresponding to a user using the hovering skateboard. For example, the database may store one or more factors corresponding to the user such as past history, profile info, health condition and so on. In an embodiment, a user using the hovering skateboard is registered with the hovering skateboard and particular profile information corresponding to the registered user is stored in the memory. Such profile information may include information that may be provided by the user while registering with the hovering skateboard and additional information that may automatically be detected by the hovering skateboard. For example, the information that may be provided by the user may include, but not limited to, age, address, health condition (if any), and thumb/finger biometric information. Further, the user may pre-set a required speed of hovering skateboard that may be tolerable by the user. Additional information that may be automatically detected by the hovering skateboard may include, but not limited to, weight of the user, and feet scanning/biometric information of the user, in an embodiment, the hovering skateboard may include a weight measuring system to determine weight of the user. The weight measuring system may determine weight through the known techniques of weight measurement. Further, in an embodiment, the weight is measured based on the repulsive force between the two boards (such as board 105 and board 115), due to the two magnetic sources (such as 110 and 120), that may be increased by increasing the weight (such as of user or any item) on the first board, In an embodiment, the user may need to authenticate himself/herself for activating the hovering skateboard. Such authentication of the user may be performed based on the stored information of the user. For example, the user may enter a password through a controlling unit (such as the controlling unit 205) for authentication. Further, the user may utilize any known technique such as (but not limited to) thumb/finger biometrics for authentication purpose.

Further, in an embodiment, the specialized safety system of the hovering skateboard may include Global Positioning System (GPS) to determine location of the hovering skateboard. The specialized system may receive input from the GPS and process the user's information (that may be pre-stored or automatically detected) accordingly. For example, once the user is authenticated, the system may control components such as the speed and direction of the hovering skateboard being used by the user, based on one or more factors corresponding to the user such as (but not limited to) the stored past information of the user, profile information, detected information (such as weight of the user) and the current location of the user. For example, if the user is a child/baby having age below a particular age (say 10 years) or a senior citizen above a particular age (say 60 years), the hovering skateboard may not allow the user to attain a speed greater than a predetermined speed at a particular location to ensure safety of the user. In an embodiment, such predetermined speed corresponding to a particular age group may be pre-set by the user or an administrator and may be stored in the memory. Further, for example, based on the user's authentication, if it is determined that the user is a child having age below 10 years and the weight (that may be determined by the hovering skateboard) of the user is lesser than a normal weight of a particular age group corresponding to the user. The hovering skateboard may reduce its speed or may assume rest state if the user (child) is at ring road (or any high speed traffic road) to ensure safety of the user. Such information corresponding to road and traffic may be determined through GPS.

Similarly, if the user is a senior citizen (say above 60 years of age) and having a weak health condition then the speed of the hovering skateboard may be auto-adjusted (i.e., adjusted automatically) that may be bearable by the user. Further, the specialized system may determine safe components (such as speed, direction control based on degree of freedom and so on) for a safe ride of such user based on the past history of the user that was stored based on safe usage of the hovering board by the user in the past. Further, direction and movements of the hovering skateboard may be adjusted automatically based on the health condition of the user. For example, for the users having less self-balancing capabilities, the movement (and change in direction) of the hovering skateboard may be smoothened. In an embodiment, the user may be enabled to override the auto-adjustment of hovering skateboard.

In an embodiment, the memory may store information corresponding to activities of the hovering skateboard (such as modified speed, changed direction, current location, time of reaching a particular location etc.). Further, a specific instruction (from the specific set of instructions as stored in the memory) may generate a detail activity report based on the activities of the hovering skateboard. Such activities of the hovering skateboard may also be stored in the database. Such report may be transmitted to a remote location through a communication unit of the specialized system of the hovering skateboard. In an embodiment, the communication unit may include (but is not limited to) a receiver for receiving an information and a transmitter for transmitting any information to a remote location.

It may be appreciated by a person skilled in the art that the present invention is not limited to the various embodiments mentioned in this disclosure. Further, in an embodiment of the present invention discloses a method of operating hovering skate board unit that may include various steps of using the hovering skate board unit by a user. The method may include, but not limited to, receiving a user on a first board having one or more first magnetic sources configured thereto. The first board is magnetically coupled to a second board. The second board may have one or more second magnetic sources configured thereto to repel magnetic field emitted from the one or more first magnetic source, thereby facilitates the first board to hover over the steered second board. Further, the method may facilitate lifting of the first board over the second board up to a predetermined height.

Further, at least one of the first magnetic sources and the second magnetic sources may be selected based on one or more parameters such as, but not limited to, required magnetic flux density, polarity, strength of magnetic field and one or more other desired parameters. Further, the method may utilize one or more connectors capable to detachably attaching the first board and the second board for creating space there-between.

Further, the method may enable the user to utilize a controlling unit to control at least one of: speed and direction of the second board. By such controlling of the second board, the user may steer the second board and thus the hovering skate board unit. In an embodiment, the method may facilitate remote controlling of the hovering skate board without depending on the presence of the user on the first board. Furthermore, the method may control at least one of: the speed and the direction of the second board by controlling at least one terrestrially engaging wheel attached to the second board. Further, the method may facilitate the user (or a remote user) to control terrestrially engaging wheels for at least one of: upward movement, downward movement, left movement, right movement, forward movement, backward movement, tilting forward, tilting backward, turning left, turning rightwards and turning from one side to another side.

The many features and advantages of the invention are apparent from the above description. It is apparent from the foregoing that a new and improved hovering skateboard has been provided. The invention is quite simple and can be used on different surfaces. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hovering skate board unit comprising:
   a first board configured to receive a user thereon, the first board having one or more first magnetic sources to emit magnetic field;
   a second board magnetically coupled with the first board, the second board having one or more second magnetic sources configured thereto to repel the magnetic field emitted from the one or more first magnetic sources, thereby facilitates the first board to hover over the second board;
   at least one terrestrially engaging wheel attached to the second board for enabling movement in direction driven by a user;
   a plurality of connectors, detachably attached to the first board and the second board for creating a space therebetween; and
   a specialized safety system for ensuring safety of the user by controlling one or more components corresponding to the hovering skateboard unit based on one or more factors corresponding to the user.

2. The hovering skate board unit of claim 1, wherein the specialized safety system comprises:
   a memory having a database and a specific set of instructions;
   a specialized processor for executing the specific set of instructions for adopting safety measures of the user;
   a Global Positioning System (GPS) to provide location information, corresponding to location of the user, to the processor, wherein the processor adjusts one or more components of the hovering skateboard unit based on at least one of the location information, and the one or more factors corresponding to the user;
   a communication unit for transmitting an activity report to a remote location, the activity report corresponding to activities of the hovering skate board unit.

3. The hovering skate board unit of claim 1 further comprising a controlling unit capable of being remotely operated, for controlling speed and directions of the second board and thereby for steering the hovering skate board unit.

4. The hovering Skate board unit of claim 3, wherein the controlling unit comprises at least one of: one or more mechanical switches, touch screen interface buttons, mechanisms which can be rotated or tilted, a wheel, a joy stick, a key pad, a roller ball, a touch pad, a foot pedal, a lever arm, a throttle, a microphone used to input voice commands and a camera used to input gesture commands.

5. The hovering skateboard unit of claim 1, wherein at least one of: the first magnetic sources and the second magnetic sources is selected from at least one of: a permanent magnet, an electromagnet, electrets, a magnetized ferromagnetic material, a soft magnetic material; and a superconductive magnetic material.

6. The hovering skateboard unit of claim 1, wherein at least one of the first magnetic sources and the second magnetic sources is selected based on one or more parameters.

7. The hovering skateboard unit of claim 1, wherein the first board is capable of lifting the user up to a predetermined height.

8. The hovering skateboard unit of claim 1, wherein a controlling unit controls the second board through at least one of: wireless means; and a wired connection.

9. The hovering skate board unit of claim 1, wherein the plurality of connectors may be made from at least one of: synthetic resin; and metal.

10. The hovering skateboard unit of claim 1, wherein the at least one terrestrially engaging wheel facilitates at least one of: upward movement, downward movement, left movement, right movement, forward movement, backward movement, tilting forward, tilting backward, turning left, turning rightwards and turning from one side to another side.

11. The hovering skate board unit of claim 1, wherein the first board is made of at least one of: hard rock maple, bamboo decks, synthetic decks using fiber glass, glue resin and other materials.

12. The hovering skate board unit of claim 1, wherein controlling the one or more components comprises controlling at least one of the speed and the direction of the second board.

13. The hovering skate board unit of claim 1, wherein the one or more factors comprise at least one of: stored past information of the user, profile information, detected information corresponding to the user and the current location of the user.

14. A method of operating hovering skate board unit comprising:
receiving a user on a first board having one or more first magnetic sources configured thereto, the first board is magnetically coupled to a second board; and
controlling one or more components corresponding to the hovering skate board based on one or more factors corresponding to the user, and thereby ensuring safety of the user while utilizing the hovering skate board,
wherein, the second board is detachably attached to the first board through one or more connectors for creating a space between the first board and the second board, the second board is having one or more second magnetic sources configured thereto to repel magnetic field emitted from the one or more first magnetic source, thereby facilitates the first board to hover over the steered second board, and
wherein the second board comprises at least one terrestrially engaging wheel attached thereto.

15. The method of claim 14, wherein controlling the one or more components comprises controlling at least one of the speed and the direction of the second board.

16. The method of claim 14 further comprising lifting the first board over the second board up to a predetermined height.

17. The method of claim 14 further comprising facilitating a user to control terrestrially engaging wheels for at least one of: upward movement, downward movement, left movement, right movement, forward movement, backward movement, tilting forward, tilting backward, turning left, turning rightwards and turning from one side to another side.

18. The method of claim 14, wherein at least one of the first magnetic sources and the second magnetic sources is selected based on one or more parameters.

19. The method of claim 14, wherein the one or more factors comprise at least one of: stored past information of the user, profile information, detected information corresponding to the user and the current location of the user.

20. The method of claim 14 further comprising transmitting an activity report to a remote location, the activity report corresponding to activities of the hovering skate board unit.

\* \* \* \* \*